United States Patent
Fulcher et al.

(10) Patent No.: US 11,565,791 B2
(45) Date of Patent: Jan. 31, 2023

(54) SENSOR-BASED EJECTION INITIATION SYSTEM

(71) Applicant: AMI Industries, Inc., Colorado Springs, CO (US)

(72) Inventors: Jackson Fulcher, Colorado Springs, CO (US); Nicholas Bharucha, Colorado Springs, CO (US); Steven Holstine, Peyton, CO (US); Casey Stribrny, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 2 days.

(21) Appl. No.: 17/231,798

(22) Filed: Apr. 15, 2021

(65) Prior Publication Data

US 2022/0332407 A1    Oct. 20, 2022

(51) Int. Cl.
*B64D 25/10* (2006.01)
*B64C 13/10* (2006.01)

(52) U.S. Cl.
CPC ............. *B64C 13/10* (2013.01); *B64D 25/10* (2013.01)

(58) Field of Classification Search
CPC ........ B64D 25/00; B64D 25/08; B64D 25/10; B64D 25/12
See application file for complete search history.

(56) References Cited

U.S. PATENT DOCUMENTS

| | | | |
|---|---|---|---|
| 4,721,273 A * | 1/1988 | Trikha | B64D 25/10 244/141 |
| 5,894,285 A | 4/1999 | Yee et al. | |
| 10,118,707 B2 * | 11/2018 | Homan | B64D 17/62 |
| 10,752,360 B2 | 8/2020 | Sinusas et al. | |

FOREIGN PATENT DOCUMENTS

EP    3974319    3/2022

OTHER PUBLICATIONS https://skiesmag.com/features/virtual-co-pilot-garmin-autoland/ Mar. 22, 2021.*
European Patent Office; European Search Report dated Aug. 8, 2022 in Application No. 22167001.1.

* cited by examiner

*Primary Examiner* — Richard G Davis
(74) *Attorney, Agent, or Firm* — Snell & Wilmer L.L.P.

(57) ABSTRACT

A method for sensor-based ejection of an aircraft occupant from an aircraft may comprise: receiving, via a processor and through a sensor, an ejection command from the aircraft occupant; comparing, via the processor, the ejection command to a predetermined ejection command; determine, via the processor, whether the ejection command matches the predetermined ejection command; and commanding, via the processor, initiation of an ejection event in response to the ejection command matching the predetermined ejection command.

18 Claims, 9 Drawing Sheets

SENSOR-BASED EJECTION INITIATION SYSTEM

FIELD

The present disclosure relates to escape systems, and more specifically, to auditory ejection mode initiation for escape systems.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. Ejections may be difficult to perform manually in various ejection situations.

SUMMARY

A method for auditory ejection of an aircraft occupant from an aircraft is disclosed herein. The method may comprise: receiving, via a processor and through a sensor, an ejection command from the aircraft occupant; comparing, via the processor, the ejection command to a predetermined ejection command; determining, via the processor, whether the ejection command matches the predetermined ejection command; and commanding, via the processor, initiation of an ejection event in response to the ejection command matching the predetermined ejection command.

In various embodiments, commanding initiation of the ejection event includes sending an electrical signal to an ejection device via the processor. The ejection device may actuate an ejection device in response to receiving the electrical signal. The method may further comprise determining an ejection sequence based on a location of the sensor in the aircraft or on the occupant being in one of a first cockpit and a second cockpit of the aircraft or on the occupant. The method may further comprise determining a non-pilot is in the second cockpit. A second ejection seat in the second cockpit may be ejected in response to the sensor being in the second cockpit. The sensor may be a microphone. The predetermined ejection command may include one of a word, series of words one time, a single word, or a word repeated multiple times.

A system for auditory ejection initiation from an aircraft is disclosed herein. The system may comprise: a first sensor; an ejection seat configured to eject from the aircraft in response to an ejection event being initiated; and a controller in operable communication with the first sensor, the controller configured to: receive through the first sensor, an ejection command from an aircraft occupant; and command initiation of the ejection event in response to the ejection command matching a predetermined ejection command.

In various embodiments, the system may further comprise a second sensor in operable communication with the ejection seat, the second sensor configured to detect physiological data from the aircraft occupant. The controller s further configured to: receive the physiological data through the second sensor; determine the aircraft occupant has at least one abnormal physiological conditions; and initiate the ejection event in response to determining the aircraft occupant has at least one abnormal physiological condition. The system may further comprise an ejection handle, the ejection handle configured to manually initiate the ejection event. The system may further comprise ejection device, wherein the command initiation of the ejection event further comprises sending an electrical signal to the ejection device. The operations may further comprise commanding a speaker to prompt the aircraft occupant whether to initiate the ejection event.

A method is disclosed herein. The method may comprise: receiving, via a processor and through a first sensor, physiological data of an aircraft occupant; and commanding via the processor, a speaker to prompt the aircraft occupant in response to the aircraft occupant having an abnormal physiological condition.

In various embodiments, the method may further comprise comparing, via the processor, the physiological data to a baseline physiological data; and determining, via the processor, the aircraft occupant having the abnormal physiological condition. The method may further comprise receiving, via the processor and through a second sensor, an ejection command from the aircraft occupant; and commanding, via the processor, initiation of an ejection event in response to the ejection command matching a predetermined ejection command. The method may further comprise comparing, via the processor, the ejection command to the predetermined ejection command; and determining, via the processor, whether the ejection command matches the predetermined ejection command. Commanding initiation of the ejection event may include sending an electrical signal to an ejection device via the processor. The method may further comprise determining an ejection sequence based on a location of the first sensor in an aircraft being in one of a first cockpit and a second cockpit of the aircraft.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
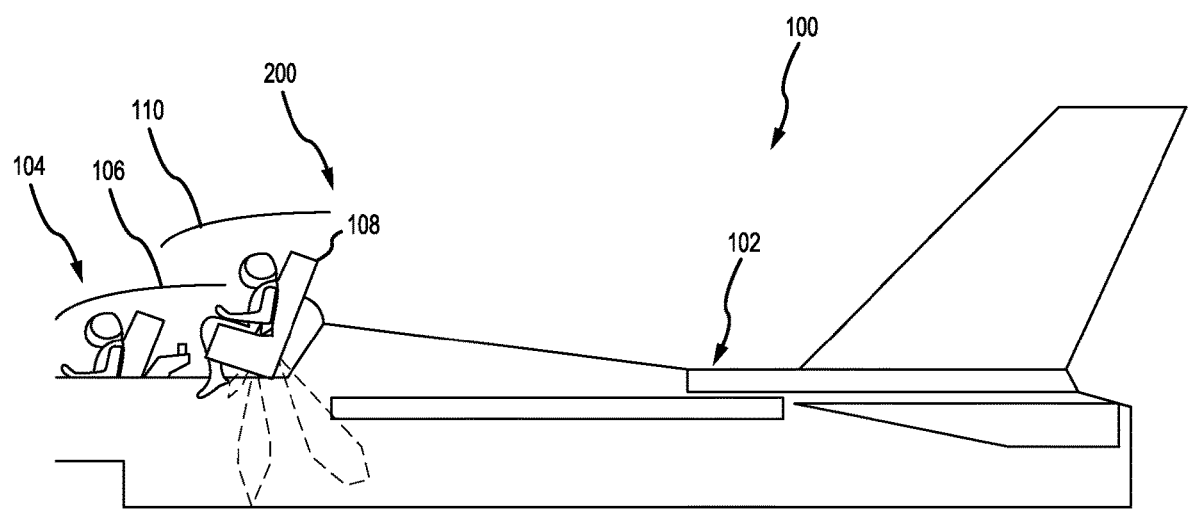
FIG. 1 illustrates an aircraft having two cockpits with respective ejection systems and a system for adjusting settings of the ejection systems, in accordance with various embodiments.

Referring now to FIG. 1, an aircraft 100 may include a fuselage 102. The fuselage 102 may define or include a cockpit 104 in which one or more member of a flight crew may be located. The fuselage 102 may further define or include a second cockpit 108 in which one or more members of a flight crew may be located. In various embodiments, the cockpit 104 may include one or more ejection systems to facilitate ejection of one or more members of the flight crew. In that regard, the first cockpit 104 may include a hatch or canopy 106 that separates from or moves relative to the first cockpit 104 to allow the member or members of the flight crew in the first cockpit 104 to eject from the fuselage 102. The second cockpit 108 may further include a hatch or canopy 110 that separates from or moves relative to the second cockpit 108 to allow the member or members of the flight crew in the second cockpit 108 to eject from the fuselage 102. The aircraft 100 may be of any appropriate type and/or configuration (e.g., a passenger aircraft, a cargo aircraft, etc.).

Figure 2A:
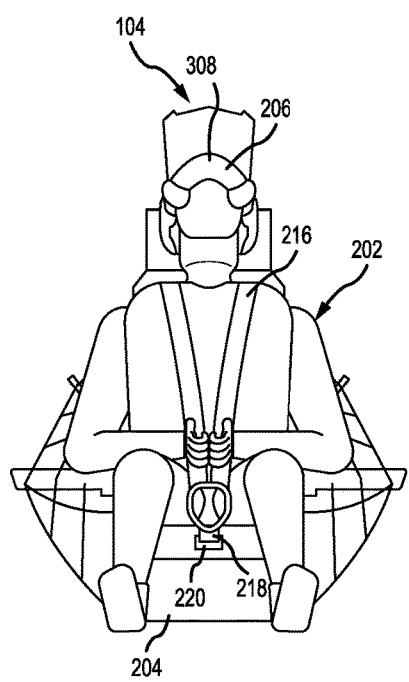
FIGS. 2A and 2B illustrate a front view and a side view, respectively, of various features of an ejection system including an ejection seat, in accordance with various embodiments.
Figure 2B:
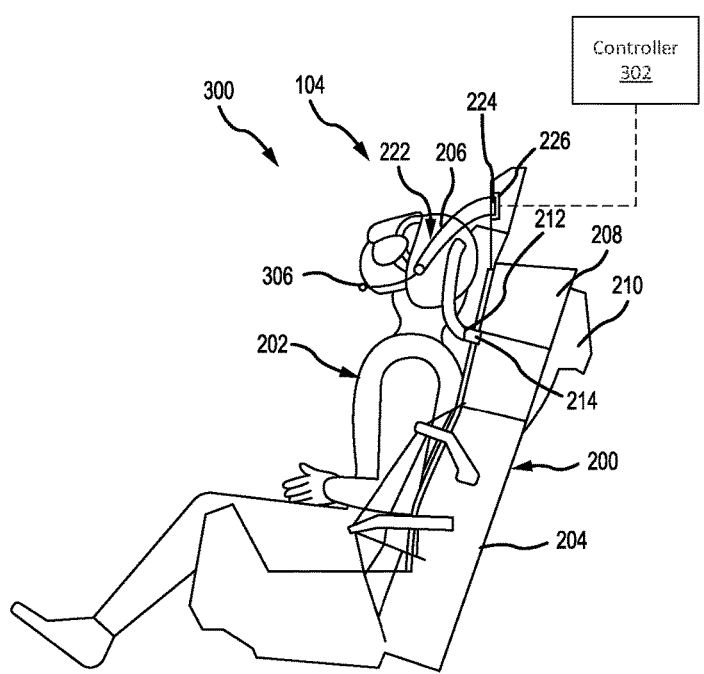

Referring now to FIGS. 2A and 2B, an exemplary ejection system 200 may be included in the cockpit 104. In particular, the ejection system 200 may include a seat 204 on which a user 202 may sit or otherwise rest and a helmet 206 which may be supported on a head of the user 202. The seat 204 may include various components of the ejection system 200 such as a main parachute 208 and a drogue 210. The seat 204 may further include a catapult or rocket that ejects the seat 204 and any occupant thereof from the cockpit 104. The drogue 210 may be a parachute that initially deploys after ejection of the seat 204 and may reduce a velocity of the seat 204 as it travels towards a ground surface. The main parachute 208 may deploy after the drogue 210 and may provide further reduction of the velocity of at least one of the seat 204 or the user 202 as it travels towards the ground surface.

In various embodiments, the ejection system 200 comprises an auditory ejection initiation system 300. The auditory ejection initiation system 300 is configured to initiate an ejection sequence of the ejection system 200 in response to detecting or receiving a predetermined word or phrase (i.e., a predetermined ejection command) used in the cockpit 104 as described further herein. The system 300 may include a controller 302 and a sensor 306. The controller 302 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, the controller 302 may further include any non-transitory memory known in the art. The memory may store instructions usable by the logic device to perform operations.

In various embodiments, the sensor 306 may include any sensor configured to convert sound waves into electrical energy variations which may then be amplified, transmitted, or recorded. For example, the sensor 306 may comprise a condenser microphone, a dynamic microphone, a carbon microphone, a piezoelectric microphone, a fiber optic microphone, a laser microphone, a liquid microphone, a Micro-Electrical-Mechanical System (MEMS) microphone, a speaker, a radio or any other device capable of wireless or wired transmissions. In various embodiments, the sensor 306 is a component of a communication system 222. For example, the sensor 306 may be disposed in any component of the communication system 222 (e.g., a headset, a radio, a transmitter, or the like).

In various embodiments, the communication system 222 may comprise a communication connector 224, which may be coupled between a component of the communication system 222 (e.g., a headset, a radio, a transmitter, or the like) and a connector 226 coupled to the seat 204 or another portion of the cockpit 104. The communication connector 224 may be removably coupled to both of the components of the communication system 222 and the connector 226 such that the user 202 may carry the communication connector 224 with him/her between aircraft. In this regard, the communication connector 224 may contain ejection specific information for a respective pilot. For example, pilots may have their own predetermined ejection initiation phrase or command, which the respective pilot may carry between aircraft.

In various embodiments, a component of the communication system 222 may be removably coupled to the aircraft (and the communication connector 224 permanently or removably coupled to the component of the communication system 222) such that the user may carry the component of the communication system 222 (with the communication connector 224) with him/her between aircraft.

In various embodiments, the system 300 may further comprise a second sensor 308 configured to monitor physiological data of user 202 during operation of aircraft 100 from FIG. 1. In various embodiments, the second sensor 308 may be disposed in helmet 206. In various embodiments, the second sensor 308 may be disposed anywhere in cockpit 104 where monitoring physiological data of user 202 may be performed. For example, second sensor 308 may be integrated into a body suit of a user 202, shoes of a user 202, on a wrist device (e.g., a watch) of a user 202, or the like. In various embodiments, physiological data may include at least one of a heart rate, brain activity, blood oxygen level, or any other physiological data used to detect abnormal physiological conditions of a user.

Figure 3:
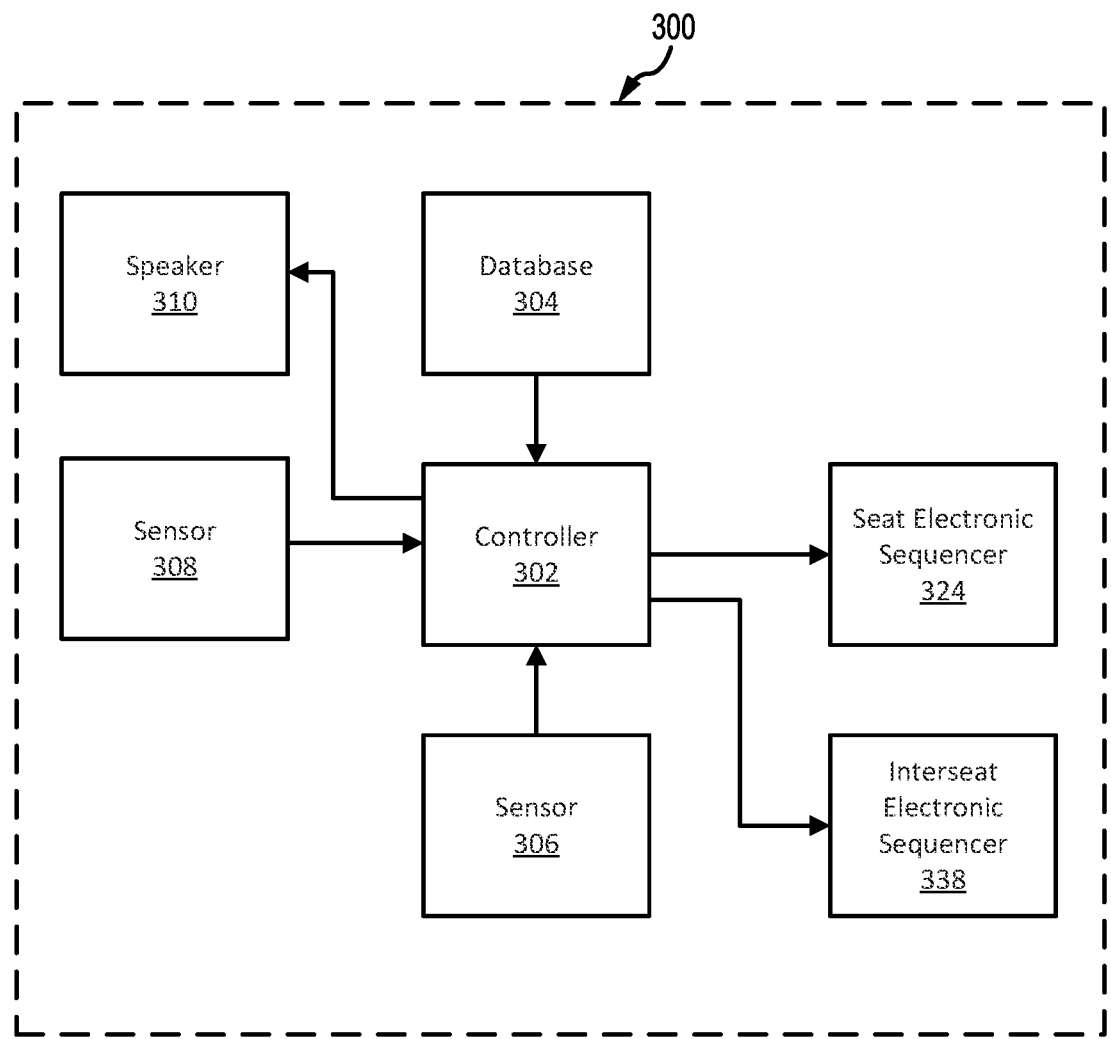
FIG. 3 illustrates a schematic view of an auditory ejection initiation system, in accordance with various embodiments.

Referring now to FIG. 3, a schematic view of auditory ejection initiation system 300 for an ejection system 200 from FIGS. 1-2B is illustrated, in accordance with various embodiments. In various embodiments, the system 300 includes the controller 302, a database 304, and the sensor 306. The database 304 (or remote memory) may be located on a same aircraft as the system 300 or may be located remote from the aircraft. The controller 302 may communicate with the database 304 via any wired or wireless protocol. In that regard, the controller 302 may access data stored in the database 304. The database 304 may store pre-determined initiation words or phrases associated with auditory ejection initiation system 300 and may store specific settings for various components of the ejection system 200.

Although illustrated as including first sensor 306 and second sensor 308, the present disclosure is not limited in this regard. For example, an auditory ejection initiation system 300 may comprise a single auditory sensor (e.g., first sensor 306) and still be within the scope of this disclosure. The second sensor 308 may be configured to provide physiological data to the controller 302. In this regard, in response to receiving the physiological data from the sensor 308, the controller 302 may compare typical physiological conditions of a user (e.g., user 202) to the received physiological data and send a command to a speaker (e.g., located in a headset or elsewhere in cockpit 104 from FIGS. 2A-B) to ask the user 202 whether the user 202 wants to eject, in accordance with various embodiments. Thus, the second sensor 308, in accordance with various embodiments, may facilitate detection of abnormal physiological conditions of a user (e.g., user 202 from FIGS. 2A-B), which may be used as an input to controller 302 to prompt the user 202 whether or not to initiate ejection system 200 from FIGS. 2A-B through a speaker 310. In various embodiments, certain physiological data may dictate that a user (e.g., user 202 from FIGS. 2A-B) is not coherent and the system (e.g., system 300) may authorize ejection in response to this determination. In various embodiments, the seat ejection initiation in response to an incoherent user may be time based (e.g., the speaker 310 may ask a user multiple times and initiate ejection if no response received within 10 seconds). In various embodiments, the system 300 may include a mechanical override in the event of equipment malfunction (e.g., in an event sensor 306 is broken).

In various embodiments, a number of seats in aircraft 100 may be directly correlated to a number of sensors 306, 308 and speaker 310. For example, two seats, as illustrated in FIG. 1, may include two sensors 306, two sensors 308, and two speakers 310 (i.e., one for each seat). Similarly, a single seat aircraft may include one sensor 306, one sensor 308, and/or one speaker 310. It is further understood, in accordance with various embodiments, that each sensor 306, 308, and 310 could include multiple sensors in the same cockpit. EG forward cockpit could have multiple sensors 306, multiple sensors 308, and multiple speakers 310. In various embodiments, for an ejection system in accordance with a dual pilot aircraft (e.g., aircraft 100 from FIG. 1), the auditory ejection initiation system 300 may further comprise a seat electronic sequencer 324 and/or an inter-seat electronic sequencer 338. Each of the seat electronic sequencer 324 and/or the inter-seat electronic sequencer 338 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, these elements may further include any non-transitory memory known in the art. The seat electronic sequencer 324 and/or the inter-seat electronic sequencer 338 may be coupled to the controller 302 and may receive the specific settings from the controller 302 or may receive instructions regarding adjustments of components of the ejection system 200 from the controller 302.

The interseat electronic sequencer 328 may make adjustments to components of the ejection system 200 that alter a sequence or timing of ejection events such as settings associated with an ejection order based on which cockpit (e.g., cockpit 104 or cockpit 108 from FIG. 1) initiates the ejection. For example, the seat electronic sequencer 324 may set only the second ejection seat in cockpit 108 to eject from aircraft 100 when initiated by a non-pilot, in accordance with various embodiments. The interseat electronic sequencer 328 may set both the first ejection seat in cockpit 104 and the second ejection seat in cockpit 108 to eject when in a dual pilot mode, in accordance with various embodiments. The interseat electronic sequencer 328 may set only the first ejection seat in cockpit 104 to eject in a single pilot mode. In this regard, the controller 302 may send a command to the interseat electronic sequencer 328 based on receiving an auditory ejection initiation from a respective sensor 306 of a first pilot, a second pilot, or a non-pilot as described further herein.

Figure 4A:
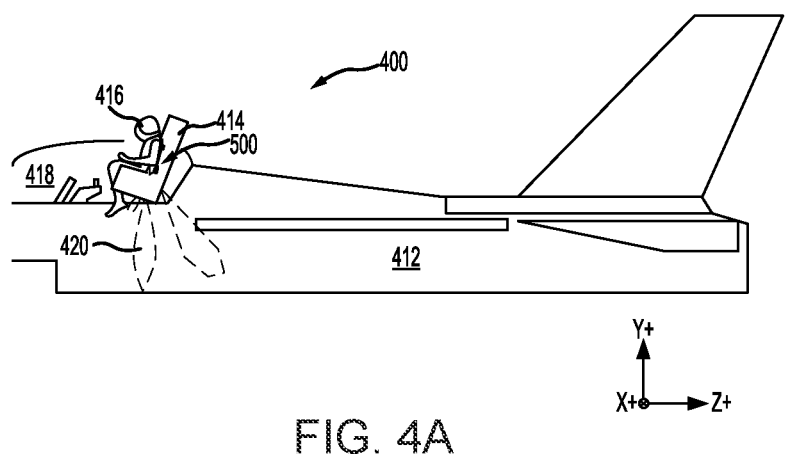
FIG. 4A illustrates an aircraft having a single cockpit, in accordance with various embodiments.

Referring now to FIG. 4A, an aircraft 400 with an auditory ejection initiation system 500 configured for a single pilot (e.g., pilot 16) is illustrated, in accordance with various embodiments. Auditory ejection initiation system 500 may be installed in aircraft 412 to expel an ejection seat 414 and a pilot 416 of ejection seat 414 from a cockpit 418 of aircraft 412. Ejection seat 414 may be expelled from cockpit 418 by a propulsion system 420.

Figure 4B:
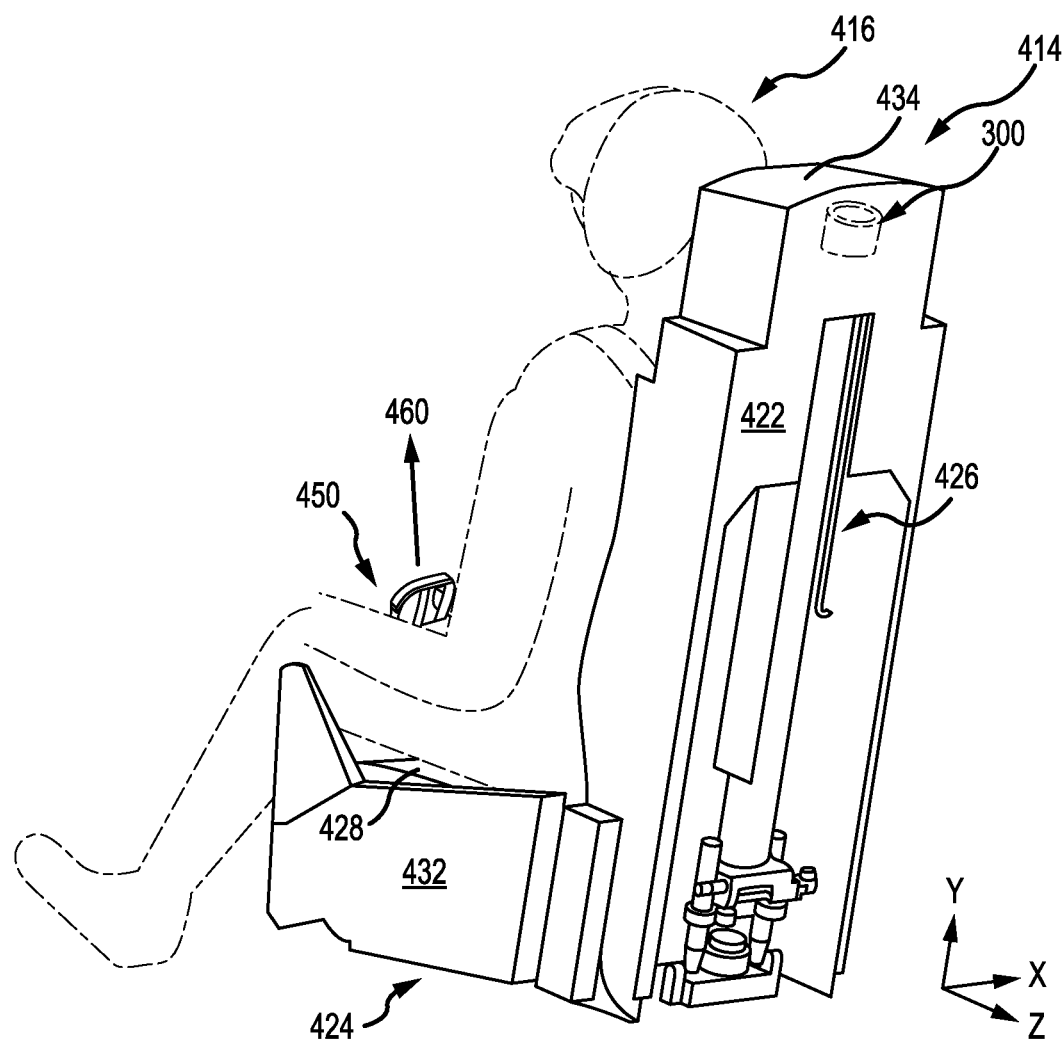
FIG. 4B illustrates an ejection system with an ejection handle, in accordance with various embodiments.

With additional reference to FIG. 4B, ejection seat 414 is illustrated prior to ejection initiation, in accordance with various embodiments. Ejection seat 414 includes a seat back 422 and a seat pan 424. A rocket catapult assembly 426 is coupled to seat back 422. In various embodiments, an ejection handle 450 may be located proximate a front 428 of seat pan 424. Front 428 of seat pan 424 is generally opposite, or distal, seat back 422. While FIG. 4B shows ejection handle 450 located at front 428 of seat pan 424, it is further contemplated and understood that ejection handle 450 may be located anywhere that is accessible to an occupant of ejection seat 414. For example, ejection handle 450 may be located on a side 432 of seat pan 424 or a headrest 434 of seat back 422.

In various embodiments, both cockpits (e.g., cockpit 104 and cockpit 108) from a dual pilot aircraft (e.g., aircraft 100 from FIG. 1) may include an ejection handle 450, in accordance with FIG. 4B. In this regard, both cockpits (e.g., cockpit 104 and cockpit 108) from a dual pilot aircraft (e.g., aircraft 100 from FIG. 1) may be configured for manual ejection, as well as auditory ejection. The present disclosure is not limited in this regard. For example, aircrafts 100, 400 may be configured for sensor-based ejection only (e.g., based on auditory data, physiological data, etc.) or dual ejection initiation methods (e.g., via ejection handle 450 or auditory ejection as described further herein.

Figure 5:
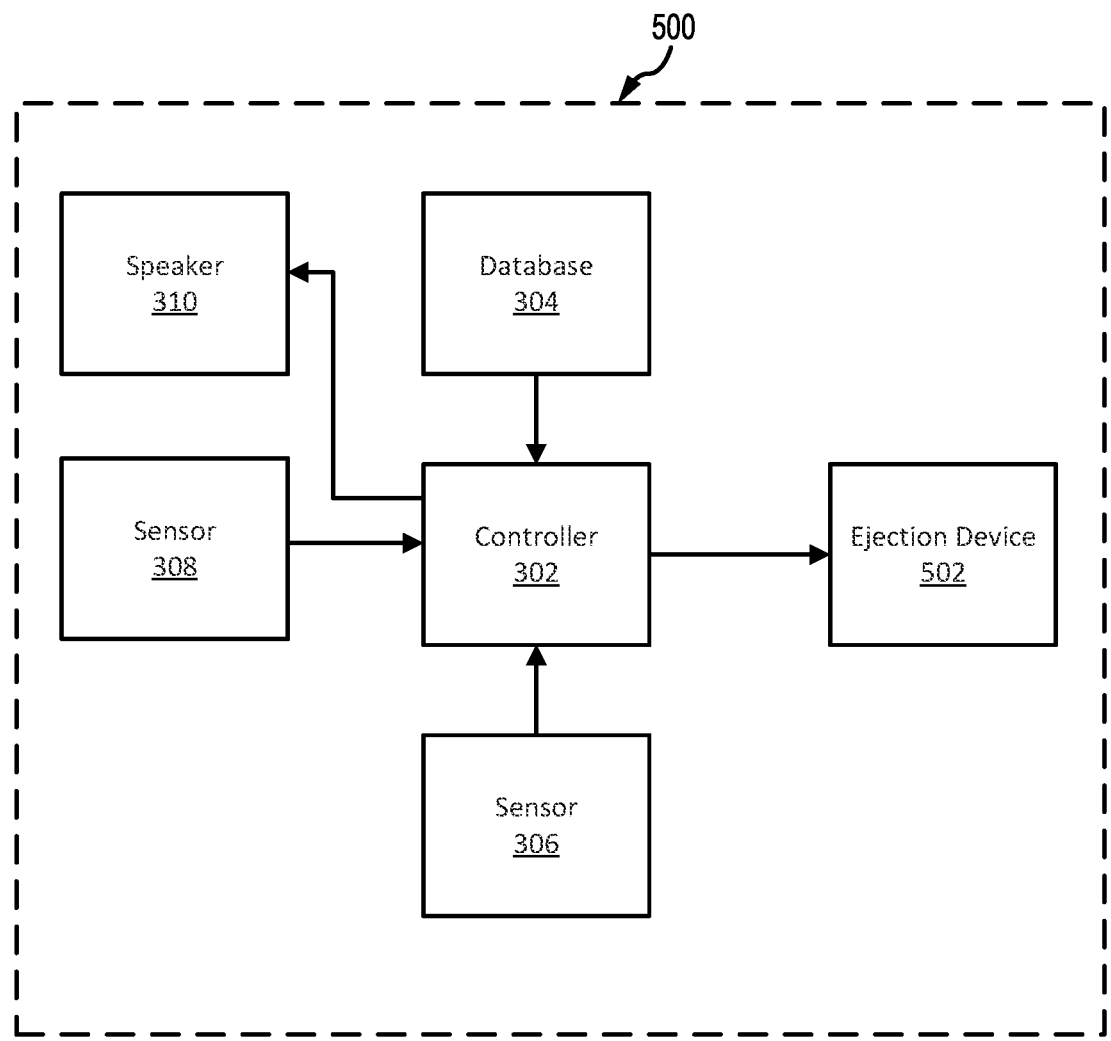
FIG. 5 illustrates a schematic view of an auditory ejection initiation system, in accordance with various embodiments.

In various embodiments, a pilot 416 may manually initiate an ejection sequence by pulling the ejection handle 450 in a vertical direction in accordance with arrow 460. Referring now to FIG. 5, an auditory ejection initiation system 500 for use in aircraft 400 is illustrated, in accordance with various embodiments. Although described herein as being used in a single pilot aircraft (e.g., aircraft 400), auditory ejection initiation system 500 may also be utilized in dual pilot aircraft (e.g., aircraft 100 from FIG. 1) and be within the scope of this disclosure. In various embodiments, the auditory ejection initiation system 500 includes the controller 302, the database 304, the sensors 306, 308, and the speaker 310 of auditory ejection initiation system 300. In various embodiments the auditory ejection initiation system 500 further comprises an ejection device 502 (e.g., a mechanical device, a ballistic device, etc.). In various embodiments, the ejection device 502 is configured to receive an electronic signal to from controller 302 initiate the ejection device. In response to receiving an electronic signal from controller 302, ejection device 502 may actuate ejection device 502 and initiate an ejection event, as described further herein.

Figure 6:
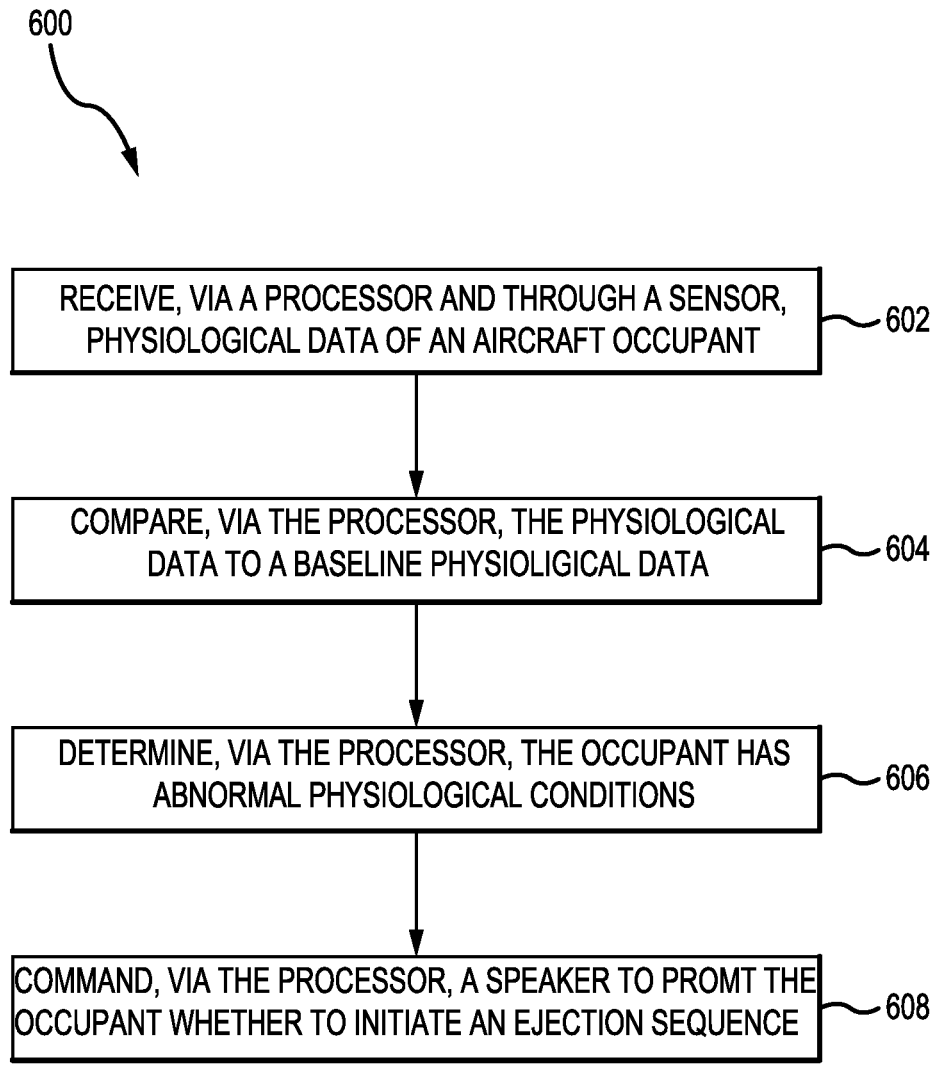
FIG. 6 illustrates a method of prompting an aircraft occupant on whether to initiate an ejection, in accordance with various embodiments.

Referring now to FIG. 6, a method 600 of prompting an occupant of an aircraft on whether to initiate an auditory ejection sequence, is illustrated, in accordance with various embodiments. The method 600 comprises receiving, via a processor (e.g., controller 302 from FIGS. 3, 5) and through a sensor (e.g., sensor 308 from FIGS. 3,5), physiological data of an aircraft occupant (e.g., user 202 from FIGS. 2A-B or pilot 416 from FIGS. 4A-B) (step 602).

In various embodiments, the method 600 further comprises comparing, via the processor, the physiological data to a baseline physiological data (step 604). The baseline physiological data may be stored in a database (e.g., database 304) or remote memory of an auditory ejection initiation system (e.g., system 300 or system 500). In various embodiments, the baseline physiological data may correspond directly to the user (e.g., uploaded in response to the user connecting connector 224 to the system 300), or may be a baseline physiological data for typical pilots, or a specific pilot.

In various embodiments, the method 600 further comprises determining, via the processor, the occupant has abnormal physiological conditions (e.g., low heartrate, low brain activity, high pulse, low oxygen levels, etc.) (step 606). In this regard, the processor may determine that the pilot is unconscious, or near unconscious.

In various embodiments, in response to determining the occupant has abnormal physiological conditions, the processor may command a speaker to prompt the occupant whether to initiate an ejection sequence (step 608). In various embodiments, in response to determining the occupant has abnormal physiological conditions over an extended period of time (e.g., a predetermined threshold), an ejection event may be initiated automatically.

Figure 7:
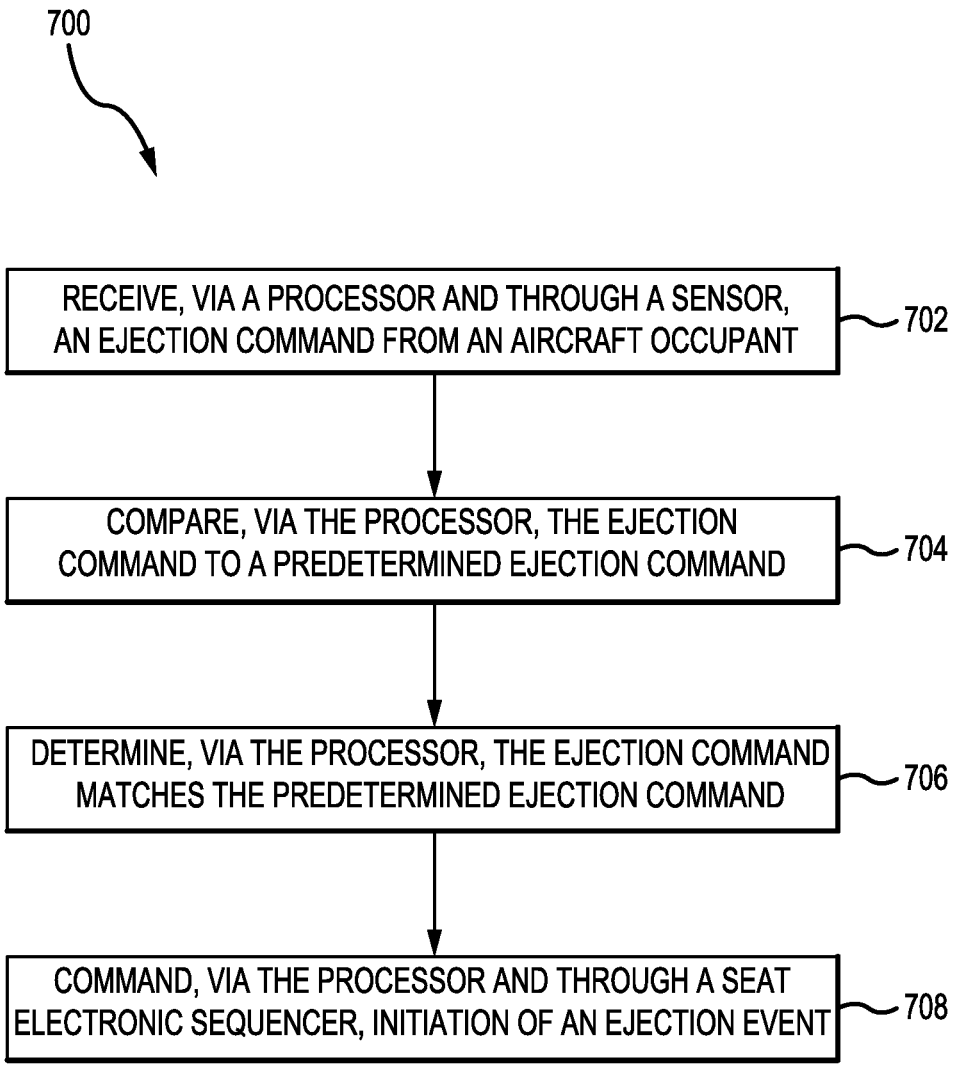
FIG. 7 illustrates a method of a sensor-based ejection, in accordance with various embodiments.

Referring now to FIG. 7, a method 700 of auditory ejection initiation via auditory ejection initiation system 300 from FIGS. 2A-3 is illustrated, in accordance with various embodiments. In various embodiments, method 700 may occur in succession with method 600 from FIG. 6. In this regard, once a user is prompted to eject, the user may initiate auditory ejection via method 700, in accordance with various embodiments.

The method 700 comprises receiving, via a processor (e.g., controller 302 from FIG. 3) and through a sensor (e.g., sensor 306 from FIG. 3), an ejection command from an aircraft occupant (e.g., user 202 from FIGS. 2A-B) (step 702). In various embodiments, the ejection command may be a single word or a phrase. In various embodiments, the ejection command may be multiple words. In various embodiments, the ejection command may be a single word repeated multiple times. For example, the ejection command may comprise saying eject three times (e.g., "EJECT, EJECT, EJECT"). In various embodiments, by having the ejection command be a single word repeated multiple times, accidental ejection may be prevented. For example, if a single word is used, an occupant may accidently say the single word while communicating with other pilots.

In various embodiments, the method 700 further comprises comparing, via the processor, the ejection command to a predetermined ejection command (step 704). In various embodiments, the predetermined ejection command may be stored in a database (e.g., database 304). In various embodiments, the ejection command may be specific to a user (e.g., uploaded to the system 300 via connector 224) or uniform across aircrafts.

In various embodiments, the method 700 further comprises determining, via the processor, the ejection command matches the predetermined ejection command (step 706) and commanding, via the processor and through a seat electronic sequencer (e.g., seat electronic sequencer 324 from FIG. 3) to initiate an ejection event (step 708). In various embodiments, the command of step 708 may include an ejection sequence based on which sensor the processor received the ejection command from in step 702. For example, in a dual pilot mode or a pilot/non-pilot mode, if the ejection command is received from a sensor corresponding to a pilot in a first cockpit (e.g., cockpit 104 from FIG. 1), the ejection event may eject both occupants (i.e., the aft occupant first, followed by the pilot in the first cockpit), in accordance with various embodiments. In various embodiments, in a pilot/non-pilot mode, if the ejection command is received from a sensor corresponding to the non-pilot, only the non-pilot may be ejected from the aircraft, in accordance with various embodiments. In a single pilot mode, only the ejection seat corresponding to the single pilot may be ejected, in accordance with various embodiments. In various embodiments, whether an occupant is a pilot, or a non-pilot may be determined by connecting connector 224 to system 300 from FIGS. 2A-B.

Figure 8:
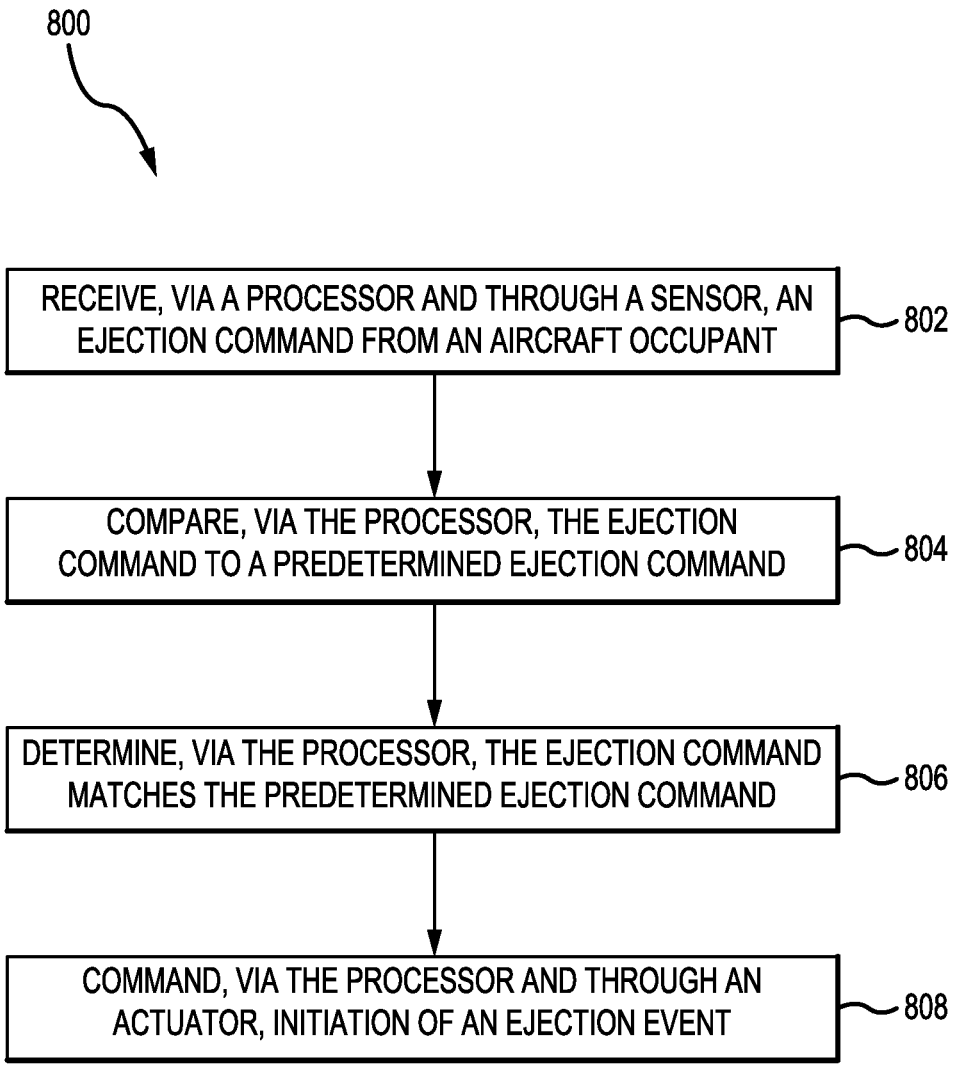
FIG. 8 illustrates a method of auditory ejection, in accordance with various embodiments.

Referring now to FIG. 8, a method 800 of auditory ejection initiation via auditory ejection initiation system 500 from FIGS. 4A-5 is illustrated, in accordance with various embodiments. In various embodiments, method 800 may occur in succession with method 600 from FIG. 6. In this regard, once a user is prompted to eject, the user may initiate auditory ejection via method 800, in accordance with various embodiments.

The method 800 comprises receiving, via a processor (e.g., controller 302 from FIG. 5) and through a sensor (e.g., sensor 306 from FIG. 3), an ejection command from an aircraft occupant (e.g., user 202 from FIGS. 2A-B) (step 702). In various embodiments, the ejection command may be a single word or a command. In various embodiments, the ejection command may be multiple words. In various embodiments, the ejection command may be a single word repeated multiple times. For example, the ejection command may comprise saying eject three times (e.g., "EJECT, EJECT, EJECT"). In various embodiments, by having the ejection command be a single word repeated multiple times, accidental ejection may be prevented. For example, if a single word is used, an occupant may accidently say the single word while communicating with other pilots.

In various embodiments, the method 800 further comprises comparing, via the processor, the ejection command to a predetermined ejection command (step 804). In various embodiments, the predetermined ejection command may be stored in a database (e.g., database 304). In various embodiments, the ejection command may be specific to a user (e.g., uploaded to the system 500 via connector 224 from FIG. 2B) or uniform across aircrafts.

In various embodiments, the method 800 further comprises determining, via the processor, the ejection command matches the predetermined ejection command (step 806) and commanding, via the processor and through an ejection device (e.g., ejection device 502 from FIG. 5) to initiate an ejection event (step 808). In various embodiments, the ejection device may be a mechanical device, a ballistic device, or the like. In this regard, in response to receiving an electrical signal from the processor, the ejection device may actuate, causing an ejection event to initiate.

In various embodiments, the auditory ejection initiation systems 300, 500 and aircraft ejection initiation methods 600, 700, 800 disclosed herein may add redundancy to an ejection initiation system. In various embodiments, the auditory ejection initiation systems 300, 500 and aircraft ejection initiation methods 600, 700, 800 disclosed herein may provide an additional method to eject an incapacitated or injured pilot. In various embodiments, the auditory ejection initiation systems 300, 500 and aircraft ejection initiation methods 600, 700, 800 may allow a pilot to position his or her arms for optimal protection in preparation of an ejection event.

Benefits, other advantages, and solutions to problems have been described herein with regard(s) to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for auditory ejection of an aircraft occupant from an aircraft, the method comprising:
   receiving, via a processor and through a sensor, an ejection command from the aircraft occupant;
   comparing, via the processor, the ejection command to a predetermined ejection command;
   determining, via the processor, whether the ejection command matches the predetermined ejection command;
   commanding, via the processor, initiation of an ejection event in response to the ejection command matching the predetermined ejection command; and
   determining an ejection sequence based on a location of the sensor in the aircraft or on the aircraft occupant being in one of a first cockpit and a second cockpit of the aircraft or on the aircraft occupant.

2. The method of claim 1, wherein commanding initiation of the ejection event includes sending an electrical signal to an ejection device via the processor.

3. The method of claim 2, wherein the ejection device actuates the ejection device in response to receiving the electrical signal.

4. The method of claim 1, further comprising determining a non-pilot is in the second cockpit.

5. The method of claim 4, wherein a second ejection seat in the second cockpit is ejected in response to the sensor being in the second cockpit.

6. The method of claim 1, wherein the sensor is a microphone.

7. The method of claim 1, wherein the predetermined ejection command includes one of a single word, a series of words one time, or a word repeated multiple times.

8. A system for auditory ejection initiation from an aircraft, the system comprising:
   a first sensor;
   an ejection seat configured to eject from the aircraft in response to an ejection event being initiated;
   a second sensor configured to detect physiological data from an aircraft occupant; and
   a controller in operable communication with the first sensor and the second sensor, the controller configured to:
      receive through the first sensor, an ejection command from the aircraft occupant; and
      command initiation of the ejection event in response to the ejection command matching a predetermined ejection command.

9. The system of claim 8, wherein the controller is further configured to:
   receive the physiological data through the second sensor;
   determine the aircraft occupant has at least one abnormal physiological conditions; and initiate the ejection event in response to determining the aircraft occupant has at least one abnormal physiological condition.

10. The system of claim 8, further comprising an ejection handle, the ejection handle configured to manually initiate the ejection event.

11. The system of claim 10, further comprising an ejection device, wherein the command initiation of the ejection event further comprises sending an electrical signal to the ejection device.

12. The system of claim 11, wherein the controller further configured to command a speaker to prompt the aircraft occupant whether to initiate the ejection event.

13. A method comprising:
receiving, via a processor and through a first sensor, physiological data of an aircraft occupant;
commanding via the processor, a speaker to prompt the aircraft occupant in response to the aircraft occupant having an abnormal physiological condition;
receiving, via the processor and through a second sensor, an ejection command from the aircraft occupant; and
commanding, via the processor, initiation of an ejection event in response to the ejection command matching a predetermined ejection command.

14. The method of claim 13, further comprising:
comparing, via the processor, the physiological data to a baseline physiological data; and
determining, via the processor, the aircraft occupant having the abnormal physiological condition.

15. The method of claim 13, further comprising:
comparing, via the processor, the ejection command to the predetermined ejection command; and
determining, via the processor, whether the ejection command matches the predetermined ejection command.

16. The method of claim 15, wherein commanding initiation of the ejection event includes sending an electrical signal to an ejection device via the processor.

17. The method of claim 15, further comprising determining an ejection sequence based on a location of the first sensor in an aircraft being in one of a first cockpit and a second cockpit of the aircraft.

18. A method for auditory ejection of an aircraft occupant from an aircraft, the method comprising:
receiving, via a processor and through a sensor, an ejection command from the aircraft occupant, wherein the sensor is a microphone;
comparing, via the processor, the ejection command to a predetermined ejection command;
determining, via the processor, whether the ejection command matches the predetermined ejection command; and
commanding, via the processor, initiation of an ejection event in response to the ejection command matching the predetermined ejection command.

* * * * *